(12) United States Patent
Bang

(10) Patent No.: US 12,365,363 B2
(45) Date of Patent: Jul. 22, 2025

(54) DEVICE AND METHOD FOR CONTROLLING AUTONOMOUS DRIVING

(71) Applicants: Hyundai Motor Company, Seoul (KR); Kia Corporation, Seoul (KR)

(72) Inventor: Kyung Joo Bang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 215 days.

(21) Appl. No.: 17/736,702

(22) Filed: May 4, 2022

(65) Prior Publication Data

US 2023/0120751 A1     Apr. 20, 2023

(30) Foreign Application Priority Data

Oct. 18, 2021   (KR) .................. 10-2021-0138719

(51) Int. Cl.
| | |
|---|---|
| *B60W 50/00* | (2006.01) |
| *B60W 50/02* | (2012.01) |
| *B60W 50/029* | (2012.01) |
| *B60W 60/00* | (2020.01) |

(52) U.S. Cl.
CPC .. *B60W 60/00186* (2020.02); *B60W 50/0205* (2013.01); *B60W 50/029* (2013.01); *B60W 2050/0215* (2013.01); *B60W 2556/65* (2020.02); *B60W 2720/10* (2013.01)

(58) Field of Classification Search
CPC ....... B60W 60/00186; B60W 50/0205; B60W 50/029; B60W 2556/65; B60W 2050/0215; B60W 2720/10

USPC .......................................................... 702/26
See application file for complete search history.

(56) References Cited

U.S. PATENT DOCUMENTS

| | | | |
|---|---|---|---|
| 2018/0268703 A1* | 9/2018 | Kang ................ | B60W 50/0098 |
| 2020/0097010 A1* | 3/2020 | Maila ................. | B60W 50/029 |
| 2020/0391757 A1 | 12/2020 | Kim et al. | |
| 2021/0206389 A1* | 7/2021 | Kim .................... | G01C 21/3885 |
| 2022/0215757 A1* | 7/2022 | Michel ................ | G08G 1/22 |
| 2022/0242426 A1* | 8/2022 | Kurokawa ......... | B60W 50/0205 |

FOREIGN PATENT DOCUMENTS

| | | | |
|---|---|---|---|
| JP | 2006329078 A | * | 12/2006 |
| KR | 1020190012954 A | | 2/2019 |
| KR | 1020200142139 A | | 12/2020 |

\* cited by examiner

*Primary Examiner* — Marc Burgess
*Assistant Examiner* — Michael T Dowling
(74) *Attorney, Agent, or Firm* — Slater Matsil, LLP

(57) ABSTRACT

A device for controlling autonomous driving includes at least one sensor disposed in an autonomous driving vehicle, wherein the sensor is configured to detect information necessary for autonomous driving of the autonomous driving vehicle. The device further includes a controller, wherein the controller is configured to diagnose a fault of the at least one sensor during autonomous driving of the autonomous driving vehicle, upon determination that the fault has occurred in the at least one sensor, to prohibit an autonomous driving related function corresponding to the fault of the at least one sensor, to determine an alternative route based on the prohibited function and to control the autonomous driving according to the determined alternative route.

11 Claims, 9 Drawing Sheets

| FAULTY SENSOR | PROHIBITED FUNCTION |
|---|---|
| FRONT REMOTE RADAR | LOWER MAXIMUM SPEED |
| RIGHT REAR RADAR | PROHIBIT LANE CHANGE TO RIGHT |
| LEFT FRONT LIDAR | PROHIBIT PASSING THROUGH INTERSECTION |
| FRONT CAMERA | PROHIBIT PASSING BY TRAFFIC LIGHT |
| REAR ULTRASONIC SENSOR | PROHIBIT AUTOMATIC PARKING |

Fig.3

DEVICE AND METHOD FOR CONTROLLING AUTONOMOUS DRIVING

CROSS-REFERENCE TO RELATED APPLICATIONS

This application claims the benefit of Korean Patent Application No. 10-2021-0138719, filed in the Korean Intellectual Property Office on Oct. 18, 2021, which application is hereby incorporated herein by reference.

TECHNICAL FIELD

The present disclosure relates to a device and a method for controlling autonomous driving, and more particularly, to a device and a method for controlling autonomous driving in an event of sensor fault during autonomous driving.

BACKGROUND

An autonomous driving vehicle requires ability to adaptively respond to changing surroundings in real time while driving. For mass production and vitalization of autonomous driving vehicles, a reliable determination control function is required above all else. The autonomous driving vehicle basically performs driving, braking and steering on behalf of a driver, thereby reducing driver fatigue.

The autonomous driving vehicle collects information through various sensors to determine a driving situation in real time. Therefore, when fault occurs in a sensor related to autonomous driving, and there is no way to deal with the fault, the sensor fault may be fatal to stability of autonomous driving. In particular, a vehicle without a driver or a vehicle without a device for manual driving switch to manual driving cannot switch to the manual driving. In this case, an occupant may not carry out the manual driving and thus may not cope with the sensor fault situation in the autonomous driving vehicle. Thus, it is necessary to develop a scheme in which the autonomous driving vehicle may set an appropriate driving route coping with the fault situation by itself and drive along the set route.

SUMMARY

Embodiments solve the above-mentioned problems occurring in the prior art while advantages achieved by the prior art are maintained intact.

Embodiments of the present disclosure provide a device and a method for controlling autonomous driving in an event of sensor fault during autonomous driving.

Other embodiments of the present disclosure provide a device and a method for controlling autonomous driving which may deal with a case where manual driving is impossible in an event of a sensor fault during autonomous driving.

Still other embodiments of the present disclosure provide a device and a method for controlling autonomous driving which may modify an autonomous driving route to move an autonomous driving vehicle to a service center when a sensor fault occurs during autonomous driving.

Still yet other embodiments of the present disclosure provide a device and a method for controlling autonomous driving which may search for and select another vehicle to receive substitute sensor information in an event of a sensor fault during autonomous driving in order to maintain autonomous driving.

Still yet other embodiments of the present disclosure provide a device and a method for controlling autonomous driving such that when it is impossible for an autonomous driving vehicle to continue autonomous driving in an event of a sensor fault during autonomous driving, the autonomous driving vehicle stops at an emergency stop place to promote safety.

The technical problems to be solved by the embodiments are not limited to the aforementioned problems, and any other technical problems not mentioned herein will be clearly understood from the following description by those skilled in the art to which the present disclosure pertains.

According to embodiments of the present disclosure, a device for controlling autonomous driving includes at least one sensor disposed in an autonomous driving vehicle to detect information necessary for autonomous driving of the autonomous driving vehicle, and a controller which diagnoses a fault of the at least one sensor during autonomous driving of the autonomous driving vehicle, upon determination that the fault has occurred in the at least one sensor, prohibits an autonomous driving related function corresponding to the fault of the at least one sensor, determines an alternative route, based on the prohibited function, and controls the autonomous driving according to the determined alternative route.

In one embodiment, the controller may create at least one alternative route candidate, evaluate the at least one alternative route candidate based on the prohibited function, and determine the alternative route, based on the evaluation result.

In one embodiment, the at least one alternative route candidate may include at least one of a route candidate having a service center as a destination or a route candidate having an emergency stop place as a destination.

In one embodiment, the controller may set a priority of the alternative route candidate based on at least one of a type of a destination of the alternative route candidate, whether the alternative route candidate passes through an existing destination, a distance from a current position of the autonomous driving vehicle to a destination of the alternative route candidate or a distance from the existing destination to the destination of the alternative route candidate, sequentially evaluate the at least one alternative route candidate according to the set priority thereof, and determine the alternative route based on the evaluation result.

In one embodiment, the controller may evaluate the alternative route candidate based on whether a point where the prohibited function is required is included in the alternative route candidate, and determine the alternative route based on the evaluation result.

In one embodiment, when a point where the prohibited function is required is included in the alternative route candidate, the controller may identify whether another vehicle that drives around the autonomous driving vehicle and is able to provide substitute sensor information for the faulty sensor is present in the alternative route candidate, and evaluate the alternative route candidate, based on whether another vehicle that drives around the autonomous driving vehicle and is able to provide the substitute sensor information is present in the alternative route candidate, and determine the alternative route, based on the evaluation result, wherein the device may further include a communication device disposed in the autonomous driving vehicle, wherein under control of the controller, the communication device communicates with the another vehicle or a server, and requests or receives the substitute sensor information thereto or therefrom.

In one embodiment, the controller may re-perform the prohibited function related to the autonomous driving using the substitute sensor information, thereby controlling the autonomous driving.

In one embodiment, the controller may create other vehicle candidates respectively having driving routes including the point where the prohibited function is required, and select another vehicle that drives around the autonomous driving vehicle and is able to provide the substitute sensor information from among the other vehicle candidates.

In one embodiment, the controller may calculate expected time ranges respectively in which the autonomous driving vehicle and the another vehicle candidate arrive at the point where the prohibited function is required, and select the another vehicle, based on whether there is an overlap between the calculated expected time ranges respectively in which the autonomous driving vehicle and the another vehicle candidate arrive at the point where the prohibited function is required.

In one embodiment, the controller may calculate a speed amount by which a speed of at least one of the autonomous driving vehicle or the another vehicle candidate should be adjusted such that the another vehicle candidate drives around the autonomous driving vehicle, based on the expected time ranges respectively in which the autonomous driving vehicle and the another vehicle candidate arrive at the point where the prohibited function is required, and select the another vehicle in consideration of a subject whose a speed needs to bed adjusted or a speed amount by which the speed is adjusted.

In one embodiment, the controller may transmit, via the communication device, to the other vehicle, the speed amount by which a speed of the other vehicle should be adjusted such that the other vehicle candidate drives around the autonomous driving vehicle.

According to embodiments of the present disclosure, a method for controlling autonomous driving includes diagnosing, by a controller, a fault in at least one sensor during autonomous driving of an autonomous driving vehicle, wherein the at least one sensor is disposed in the autonomous driving vehicle to detect information necessary for the autonomous driving, upon determination that the fault has occurred in the at least one sensor, prohibiting, by the controller, an autonomous driving related function corresponding to the fault of the at least one sensor, determining, by the controller, an alternative route, based on the prohibited function, and controlling, by the controller, the autonomous driving according to the determined alternative route.

In one embodiment, the determining, by the controller, of the alternative route may include creating, by the controller, at least one alternative route candidate, evaluating, by the controller, the at least one alternative route candidate based on the prohibited function, and determining, by the controller, the alternative route, based on the evaluation result.

In one embodiment, the evaluating, by the controller, of the at least one alternative route candidate, and the determining, by the controller, of the alternative route may include setting, by the controller, a priority of the alternative route candidate based on at least one of a type of a destination of the alternative route candidate, whether the alternative route candidate passes through an existing destination, a distance from a current position of the autonomous driving vehicle to a destination of the alternative route candidate or a distance from the existing destination to the destination of the alternative route candidate, sequentially evaluating, by the controller, the at least one alternative route candidate according to the set priority thereof, and determining, by the controller, the alternative route based on the evaluation result.

In one embodiment, the evaluating, by the controller, of the at least one alternative route candidate, and the determining, by the controller, of the alternative route may include evaluating, by the controller, the alternative route candidate based on whether a point where the prohibited function is required is included in the alternative route candidate, and determining, by the controller, the alternative route based on the evaluation result.

In one embodiment, the evaluating, by the controller, of the at least one alternative route candidate, and the determining, by the controller, of the alternative route may include, when a point where the prohibited function is required is included in the alternative route candidate, identifying, by the controller, whether another vehicle that drives around the autonomous driving vehicle and is able to provide substitute sensor information for the faulty sensor is present in the alternative route candidate, evaluating, by the controller, the alternative route candidate, based on whether another vehicle that drives around the autonomous driving vehicle and is able to provide the substitute sensor information is present in the alternative route candidate, and determining, by the controller, the alternative route, based on the evaluation result.

In one embodiment, the identifying, by the controller, of whether another vehicle that drives around the autonomous driving vehicle and is able to provide substitute sensor information for the faulty sensor is present in the alternative route candidate may include creating, by the controller, other vehicle candidates respectively having driving routes including the point where the prohibited function is required, and selecting, by the controller, another vehicle that drives around the autonomous driving vehicle and is able to provide the substitute sensor information from among the other vehicle candidates.

In one embodiment, the selecting, by the controller, of another vehicle that drives around the autonomous driving vehicle and is able to provide the substitute sensor information from among the other vehicle candidates may include calculating, by the controller, expected time ranges respectively in which the autonomous driving vehicle and the another vehicle candidate arrive at the point where the prohibited function is required, and selecting, by the controller, the another vehicle, based on whether there is an overlap between the calculated expected time ranges respectively in which the autonomous driving vehicle and the another vehicle candidate arrive at the point where the prohibited function is required.

In one embodiment, the selecting, by the controller, of another vehicle that drives around the autonomous driving vehicle and is able to provide the substitute sensor information from among the other vehicle candidates may include calculating, by the controller, a speed amount by which a speed of at least one of the autonomous driving vehicle or the another vehicle should be adjusted such that the another vehicle candidate drives around the autonomous driving vehicle, based on the expected time ranges respectively in which the autonomous driving vehicle and the another vehicle candidate arrive at the point where the prohibited function is required, and selecting, by the controller, the another vehicle in consideration of a subject whose a speed is to be adjusted or a speed amount by which the speed is adjusted.

In one embodiment, the method may further include transmitting, via a communication device, to the other vehicle, the speed amount by which a speed of the other vehicle should be adjusted such that the other vehicle candidate drives around the autonomous driving vehicle, wherein the communication device is disposed in the autonomous driving vehicle.

BRIEF DESCRIPTION OF THE DRAWINGS

The above and other objects, features and advantages of the present disclosure will be more apparent from the following detailed description taken in conjunction with the accompanying drawings:

FIG. 3 is a table in which an autonomous driving control device according to another embodiment of the present disclosure corresponds a sensor in which fault occurs to a prohibited function;

DETAILED DESCRIPTION OF ILLUSTRATIVE EMBODIMENTS

Figure 1:
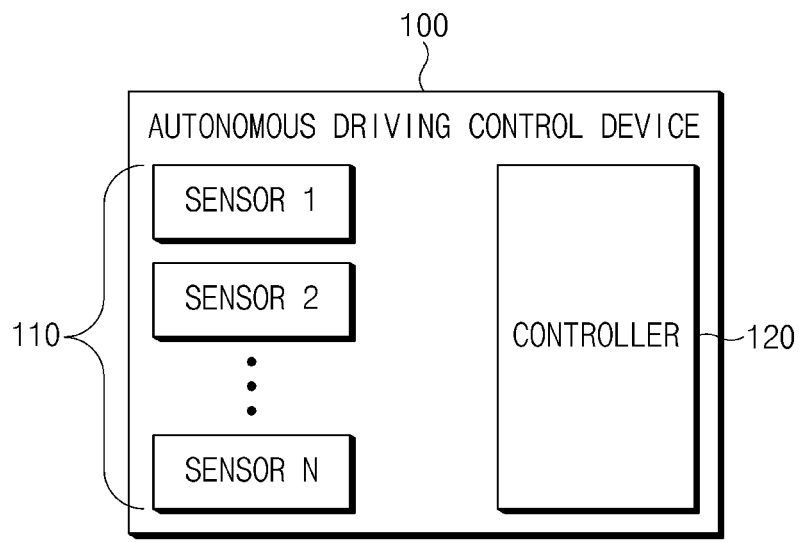
FIG. 1 is a block diagram showing an autonomous driving control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, with reference to FIGS. 1 to 9, embodiments of the present disclosure will be described in detail.

FIG. 1 is a block diagram showing an autonomous driving control device according to an embodiment of the present disclosure.

Referring to FIG. 1, an autonomous driving control device 100 may include at least one sensor 110 and a controller 120.

The autonomous driving control device 100 according to the present disclosure may be implemented inside or outside the vehicle. In this connection, the autonomous driving control device 100 may be implemented integrally with the vehicle's internal control units, or may be implemented as a separate hardware device and connected to the vehicle's control units via connection means.

In one example, the autonomous driving control device 100 may be implemented integrally with the vehicle, or may be implemented as a separate component from the vehicle which may be installed/attached in/to the vehicle. Alternatively, some components of the autonomous driving control device 100 may be implemented integrally with the vehicle, and the other components thereof may be implemented as a separate component from the vehicle which may be installed/attached in/to the vehicle.

The at least one sensor 110 may be disposed on the autonomous driving vehicle and may detect information necessary for autonomous driving of the autonomous driving vehicle.

In one example, the at least one sensor 110 may include at least one of a camera, a lidar, a radar or an ultrasonic sensor that detects information necessary for autonomous driving of the autonomous driving vehicle.

Specifically, the at least one sensor 110 may include sensors classified based on a direction or a distance in or at which the sensor detects information necessary for autonomous driving.

In one example, the at least one sensor no may include at least one of a front long-range radar, a left rear radar, a right rear radar, a left front lidar, a right front lidar or a rear ultrasonic sensor.

The at least one sensor no may be connected to the controller 120 and transmit sensed sensor information to the controller 120.

The controller 120 may perform overall control so that each of components may perform a function thereof normally. The controller 120 may be implemented in a form of hardware, software, or a combination of hardware and software. Preferably, the controller 120 may be implemented as a microprocessor, but is not limited thereto. Further, the controller 120 may perform various data processing and calculations, which will be described later.

The controller 120 may diagnose fault of the at least one sensor no during autonomous driving of the autonomous driving vehicle.

In one example, the controller 120 may diagnose the fault of the at least one sensor no based on sensor information received from the at least one sensor no during autonomous driving of an autonomous driving vehicle.

In one example, the controller 120 may diagnose the fault of the at least one sensor no using a preset fault diagnosis process.

The fault diagnosis process used by the controller 120 may include a process of diagnosing the fault based on a comparing result between a sensor value acquired in real time and a sensor value in a preset normal range. The present disclosure is not necessarily limited thereto. Various fault diagnosis processes may be employed.

When it is determined that the fault has occurred in at least one sensor, the controller 120 may prohibit an autonomous driving function corresponding to the fault in the at least one sensor.

In one example, when the controller 120 determines that at least one sensor has a fault, the controller 120 may prohibit a function related to autonomous driving corresponding to the fault of the at least one sensor, based on information about an autonomous driving related function corresponding a faulty sensor and thus to be prohibited, as preset and stored in the memory.

The autonomous driving related function corresponding to the faulty sensor and thus to be prohibited will be described in detail later with reference to a table in FIG. 3.

The controller 120 may determine an alternative route based on the prohibited function.

In one example, the controller 120 may determine the alternative route based on a point where the prohibited function is required.

The controller 120 may determine the point where the prohibited function is required, based on map information and navigation information considered in a process of controlling autonomous driving.

In one example, when the prohibited function is to lower a maximum speed, the controller 120 may determine a point where the vehicle enters a road in which a minimum limited speed is higher than the lowered maximum speed as the point where the prohibited function is required.

In another example, when the prohibited function is to prohibit the vehicle from passing through an intersection, the controller 120 may determine an intersection point as the point where the prohibited function is required.

In still another example, when the prohibited function is to prohibit the vehicle from passing by a traffic light, the controller 120 may determine a traffic light point as the point where the prohibited function is required.

In one example, the controller 120 may create at least one alternative route candidate, evaluate the alternative route candidate based on the prohibited function, and determine the alternative route based on the evaluation result.

In this connection, the at least one alternative route candidate may include at least one of a route candidate having a service center as a destination or a route candidate having an emergency stop place as a destination.

In one example, the controller 120 may set a route candidate having a service center as a destination, based on information on a location of a preset service center determined based on the navigation information or the map information.

In one example, the controller 120 may set a route candidate having a preset emergency stop place as a destination.

In one example, the controller 120 may use a navigation of the autonomous driving vehicle or a route setting algorithm used for the autonomous driving to set the route candidate.

The controller 120 may set a priority of the alternative route candidate based on at least one of a type of a destination of the alternative route candidate, whether the alternative route candidate passes through an existing destination, a distance from a current position of the autonomous driving vehicle to the destination of the alternative route candidate, or a distance from the existing destination to the destination of the alternative route candidate.

In one example, the controller 120 may set a priority of an alternative route candidate whose a destination type is a service center to be higher than a priority of an alternative route candidate whose a destination type is an emergency stop place.

In one example, the controller 120 may set a priority of an alternative route candidate passing through the existing destination to be higher than a priority of an alternative route candidate not passing through the existing destination.

In one example, the controller 120 may set a priority of an alternative route candidate to be higher as a distance from the current position of the autonomous driving vehicle to a destination of the alternative route candidate is smaller.

In one example, the controller 120 may set a priority of an alternative route candidate to be higher as a distance from the existing destination to a destination of the alternative route candidate is smaller.

The controller 120 may sequentially evaluate alternative route candidates according to the set priorities and determine an alternative route based on the evaluation result.

In one example, the controller 120 may sequentially evaluate the alternative route candidates according to the set priorities. Then, when a specific alternative route candidate is evaluated as suitable as an alternative route, the controller 120 may determine the specific alternative route candidate as a final alternative route.

In one example, the controller 120 may evaluate an alternative route candidate based on whether a point where the prohibited function is required is included in the alternative route candidate, and may determine an alternative route based on the evaluation result.

Specifically, when the point where the prohibited function is required is not included in a specific alternative route candidate, the controller 120 may evaluate the specific alternative route candidate as suitable as an alternative route and determine the specific alternative route candidate as a final alternative route.

In one example, when the point where the prohibited function is required is included in an alternative route candidate, the controller 120 may identify whether another vehicle that drives around the autonomous driving vehicle and may provide substitute sensor information for the faulty sensor is present in the alternative route candidate. Thus, the controller 120 may evaluate the alternative route candidate, based on whether another vehicle that drives around the autonomous driving vehicle and may provide the substitute sensor information is present in the alternative route candidate, and may determine an alternative route based on the evaluation result.

In one example, the controller 120 may create other vehicle candidates having a driving route including a point where a prohibited function is required, and may select another vehicle that may provide substitute sensor information while driving around the autonomous driving vehicle among the other vehicle candidates.

Specifically, the controller 120 may acquire information about another vehicle through a communication device communicating with a server or another vehicle.

Although not shown, the autonomous driving control device 100 may further include the communication device that communicates with the server or another vehicle.

In one example, the server may include a server managing an autonomous driving vehicle.

In one example, the controller 120 may obtain information on a driving route of at least one another vehicle from the server or another vehicle through the communication device, and may determine whether a point where a prohibited function is required is included in the obtained driving route of another vehicle, and then may select another vehicle having the driving route including the point where the prohibited function is required as another vehicle candidate.

In another example, the process of identifying whether the point where the prohibited function is required is included in the driving route of another vehicle, and the process of selecting another vehicle having the driving route including the point where the prohibited function is required as another vehicle candidate may be carried out by the server. The controller 120 may receive information on a list of the selected other vehicle candidates from the server through the communication device.

In one example, the controller 120 may calculate expected time ranges respectively in which the autonomous driving vehicle and the another vehicle candidate arrive at the point where the prohibited function is required, and may select another vehicle which drives around the autonomous driving vehicle and may provide the substitute sensor information, based on whether there is an overlap between the calculated expected time ranges respectively in which the autonomous driving vehicle and the another vehicle candidate arrive at the point where the prohibited function is required.

Specifically, the controller 120 may calculate the expected time ranges respectively in which the autonomous driving vehicle and the another vehicle candidate arrive at the point where the prohibited function is required, based on driving routes, driving speeds, or road conditions of the autonomous driving vehicle and the another vehicle candidate, respectively.

In this connection, the driving speed may be adjusted according to a driving situation up to the point where the prohibited function is required. Thus, an expected time at which each of the autonomous driving vehicle and the other vehicle candidate arrives at the point where the prohibited function is required may be calculated as a time range.

In one example, the controller 120 may calculate a speed amount by which a speed of at least one of the autonomous driving vehicle or the another vehicle candidate must be adjusted such that the another vehicle candidate drives around the autonomous driving vehicle, based on the expected time ranges respectively in which the autonomous driving vehicle and the another vehicle candidate arrive at the point where the prohibited function is required. Then, the controller 120 may select another vehicle in consideration of a subject whose a speed is to be adjusted or the speed amount by which the speed is adjusted.

In one example, the controller 120 may calculate the speed amount by which the speed of each of the autonomous driving vehicle and the another vehicle candidate must be adjusted such that the expected time ranges respectively in which the autonomous driving vehicle and the another vehicle candidate arrive at the point where the prohibited function is required are the same as each other or a difference therebetween is smaller than a threshold value in order that the another vehicle candidate and the autonomous driving vehicle join at the point where the prohibited function is required.

In one example, the speed amount by which the speed of each of the another vehicle candidate and the autonomous driving vehicle should be adjusted may be calculated as a difference between an average speed according to an existing planned speed profile and an average speed according to a speed profile after the adjustment. Alternatively, the speed amount by which the speed of each of the other vehicle candidate and the autonomous driving vehicle should be adjusted may be calculated as a maximum value of a difference between an existing speed and a speed after the adjustment at the same time in the speed profile. Alternatively, the speed amount by which the speed of each of the other vehicle candidate and the autonomous driving vehicle should be adjusted may be calculated as a value obtained by integrating the speed difference until each of the other vehicle candidate and the autonomous driving vehicle arrives at the point where the prohibited function is required.

The speed amount by which each of the other vehicle candidate and the autonomous driving vehicle should be adjusted may be calculated based on a time at which each of the another vehicle candidate and the autonomous driving vehicle arrives at the point where the prohibited function is required.

In one example, when another vehicle that drives around the autonomous driving vehicle and may provide the substitute sensor information has been selected from among the other vehicle candidates, the controller 120 may determine that another vehicle which drives around the autonomous driving vehicle and may provide the substitute sensor information is present. Thus, the controller 120 may evaluate the corresponding alternative route candidate as suitable as an alternative route and determine the corresponding alternative route candidate as a final alternative route.

The controller 120 may control autonomous driving according to the final alternative route.

The communication device may be disposed in the autonomous driving vehicle. Under control of the controller, the communication device may communicate with another vehicle or the server and may request or receive the substitute sensor information thereto or therefrom.

In one example, the controller 120 may control autonomous driving by re-performing the prohibited autonomous driving related function using the substitute sensor information.

The controller 120 may communicate with another vehicle or the server in real time through the communication device during autonomous driving, may request and receive the substitute sensor information thereto or therefrom, and thus may replace sensor information of the faulty sensor with the received substitute sensor information, and may perform autonomous driving based on the received substitute sensor information.

In one example, the controller 120 may transmit, via the communication device, to the other vehicle, the speed amount by which a speed of the other vehicle has to be adjusted so that the other vehicle drives around the autonomous driving vehicle.

Accordingly, the other vehicle may receive information on the speed amount to be adjusted. Thus, according to the information on the speed amount, the other vehicle may adjust the speed thereof, so that the autonomous driving vehicle and the other vehicle may join at the point where the prohibited function is required.

After the autonomous driving vehicle and the other vehicle join at the point, the other vehicle may transmit the substitute sensor information to the autonomous driving vehicle having the faulty sensor in real time so that the autonomous driving vehicle utilizes the substitute sensor information.

Figure 2:
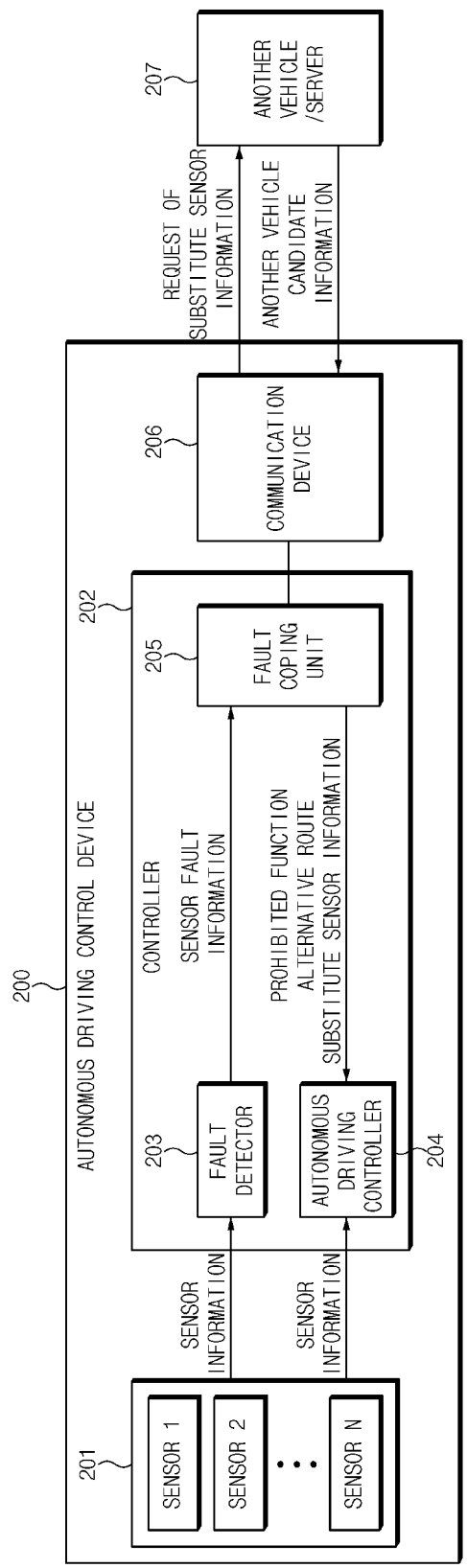
FIG. 2 is a diagram showing a specific configuration of an autonomous driving control device according to another embodiment of the present disclosure.

FIG. 2 is a diagram showing a specific configuration of an autonomous driving control device according to another embodiment of the present disclosure.

Referring to FIG. 2, an autonomous driving control device 200 may include at least one sensor 201, a controller 202 and a communication device 206.

The controller 202 may include a fault detector 203, an autonomous driving controller 204 and a fault coping unit 205.

The at least one sensor 201 disposed in the autonomous driving vehicle may acquire sensor information about autonomous driving, and transmit the acquired sensor information to the fault detector 203 and the autonomous driving controller 204.

The fault detector 203 may identify whether a fault has occurred in at least one of the at least one sensor 201 based on the received sensor information.

When it is identified that the fault has occurred in at least one sensor among the at least one sensor 201, the fault detector 203 may transmit sensor fault information to the fault coping unit 205.

The sensor fault information may include information on which sensor the fault has occurred.

The autonomous driving controller 204 may control autonomous driving of the autonomous driving vehicle based on the received sensor information.

In one example, the autonomous driving controller 204 may control steering, acceleration and deceleration of the autonomous driving vehicle based on the received sensor information to perform at least one of driving speed control, lane change, or reversing of the autonomous driving vehicle.

The fault coping unit 205 may perform a preset sensor fault coping strategy corresponding to the sensor in which the fault occurred, based on the sensor fault information received from the fault detector 203.

In one example, the preset sensor fault coping strategy may include prohibition of the autonomous driving related function that uses the sensor information about the sensor where the fault occurred.

Further, the fault coping unit 205 may set an alternative route as a modification of an existing driving route of the autonomous driving vehicle in response to the sensor fault.

In one example, the fault coping unit 205 may create at least one alternative route candidate having a service center or an emergency stop place as a destination in order to set the alternative route, and may allocate a priority to the alternative route candidate, and may sequentially evaluate whether the alternative route candidate is appropriate, according to the priority, and may set a suitable alternative route candidate as a final alternative route.

In one example, the fault coping unit 205 may evaluate the alternative route candidate as suitable when the alternative route candidate does not pass through a point where a prohibited function is required. When the alternative route candidate passes through the point where the prohibited function is required, and further when another vehicle that may provide the substitute sensor information while driving around the autonomous driving vehicle is present in the alternative route candidate, the fault coping unit 205 may evaluate alternative route candidate as suitable.

In one example, in order that the fault coping unit 205 determines whether another vehicle that may provide the substitute sensor information while driving around the autonomous driving vehicle is present in the alternative route candidate, the fault coping unit 205 may identify whether another vehicle that may provide the substitute sensor information while driving around the autonomous driving vehicle is present among other vehicle candidates.

The fault coping unit 205 may receive information about other vehicle candidates from other vehicles or a server 207.

In one example, the fault coping unit 205 may create another vehicle passing through the point where the prohibited function is required as another vehicle candidate.

When an expected time range in which another vehicle candidate among the other vehicle candidates arrives at the point where the prohibited function is required overlaps with an expected time range in which the autonomous driving vehicle arrives at the point where the prohibited function is required, the fault coping unit 205 may determine that another vehicle that may provide the substitute sensor information while driving around the autonomous driving vehicle is present.

The fault coping unit 205 may transmit information about the set alternative route to the autonomous driving controller 204.

When the autonomous driving vehicle drives autonomously past the point where the prohibited function is required, the fault coping unit 205 may request and receive the substitute sensor information obtained from the another vehicle to and from the server 207 or the another vehicle in real time through the communication device 206.

The fault coping unit 205 may transmit the received substitute sensor information to the autonomous driving controller 204.

The autonomous driving controller 204 may perform autonomous driving of the autonomous driving vehicle, based on sensor information of the at least one sensor 201 in which no fault has occurred, information on the prohibited function as received from the fault coping unit 205, information on the alternative route, and the substitute sensor information.

FIG. 3 is a table in which the autonomous driving control device according to another embodiment of the present disclosure corresponds a sensor in which a fault occurs to a prohibited function.

Referring to FIG. 3, examples of fault sensors may include a front remote radar, a right rear radar, a left front lidar, a front camera, and a rear ultrasonic sensor.

The autonomous driving control device 100 or 200 may lower an autonomous driving maximum speed when a fault occurs in the front remote radar. This may be because, when a fault occurs in the front remote radar, a front remote obstacle may not be recognized properly, and thus a risk of an accident increases when a speed is high.

The autonomous driving control device 100 or 200 may prohibit lane change to the right when a fault occurs in the right rear radar. This may be because, when a fault occurs in the right rear radar, right rear another vehicle may not be recognized properly, and a risk of colliding with the right rear another vehicle when lane change to the right is performed increases.

The autonomous driving control device 100 or 200 may prohibit lane change to the left for a similar reason to the above reason when a fault occurs in the left rear radar.

The autonomous driving control device 100 or 200 may prohibit passing through an intersection when a fault occurs in the left front lidar. This may be because, when a fault occurs in the left front lidar, a vehicle going straight in a left lane of the intersection or a vehicle turning left in the opposite lane may not be recognized properly, thereby increasing a risk of colliding with another vehicle.

The autonomous driving control device 100 or 200 may prohibit passing through the intersection for a similar reason to the above reason when a fault occurs in the right front lidar.

The autonomous driving control device 100 or 200 may prohibit passing by a traffic light when a fault occurs in the front camera. This may be because when a fault occurs in the front camera, a signal from a front traffic light may not be recognized properly, thereby increasing a risk of accident.

The autonomous driving control device 100 or 200 may prohibit automatic parking when a fault occurs in the rear ultrasonic sensor. This may be because when a fault occurs in the rear ultrasonic sensor, a rear obstacle may not be recognized properly during the automatic parking, thereby increasing a risk of a contact accident.

In the table of FIG. 3, the prohibited function corresponding to the sensor in which the fault occurred is disclosed by way of example. The present disclosure is not limited thereto. The prohibited function may include autonomous driving related functions performed using sensor information of the sensor but prohibited when the fault occurs in the sensor.

Figure 4:
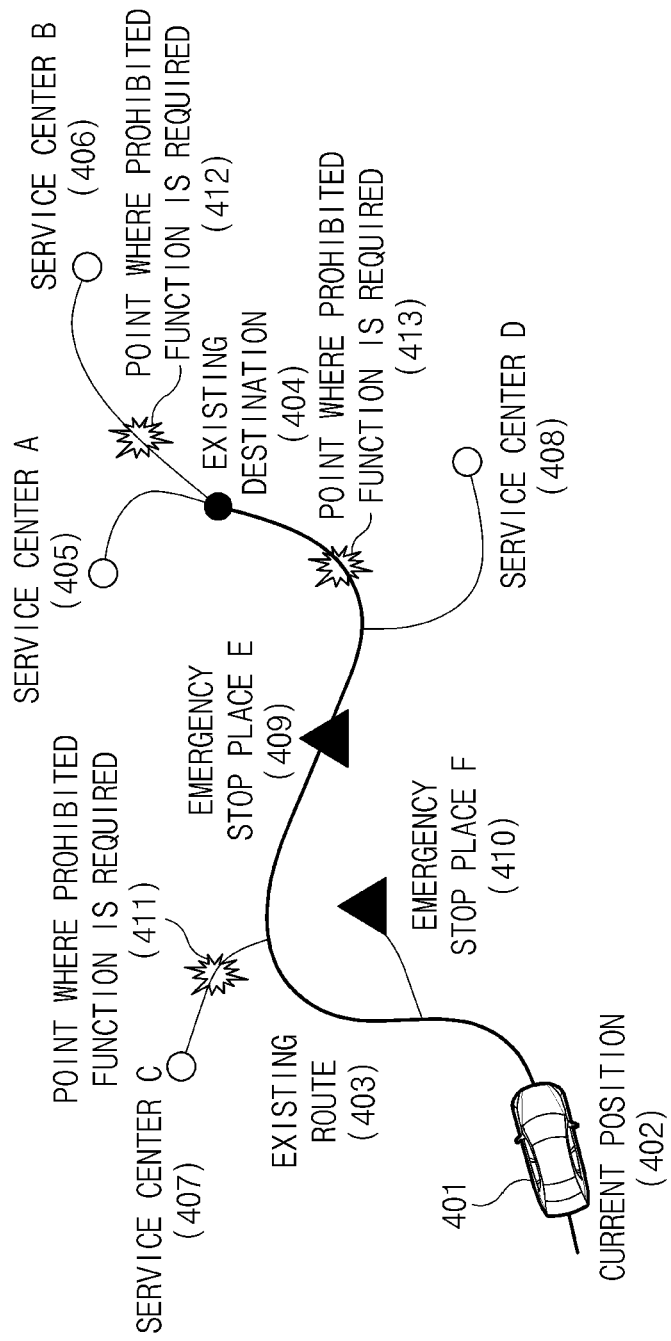
FIG. 4 is a diagram showing a process in which an autonomous driving control device according to an embodiment of the present disclosure creates an alternative route candidate.

FIG. 4 is a diagram showing a process in which an autonomous driving control device according to an embodiment of the present disclosure creates an alternative route candidate.

Referring to FIG. 4, an autonomous driving vehicle 401 may have a driving plan to drive along an existing route 403 from a current position 402 to an existing destination 404 before a sensor fault occurs.

When the fault occurs in the sensor of the autonomous driving vehicle 401, the autonomous driving control device 100 or 200 may create, as alternative route candidates, routes including an alternative route having a service center A 405 as a destination, an alternative route having a service center B 406 as a destination, an alternative route having a service center C 407 as a destination, an alternative route having a service center D 408 as a destination, an alternative route having an emergency stop place E 409 as a destination, and an alternative route having an emergency stop place F 410 as a destination.

The autonomous driving control device 100 or 200 may set the priorities of the alternative route candidates.

In one example, the autonomous driving control device 100 or 200 may set a priority of an alternative route candidate passing through the existing destination 404 (an alternative route having the service center A 405 as a destination, and an alternative route having the service center B 406 as a destination) to be higher than those of other alternative route candidates.

In one example, because the service center A 405 is closer to the existing destination 404 than the service center B 406 is, the autonomous driving control device 100 or 200 may set a priority of an alternative route candidate having the service center A 405 as a destination to be higher than that of an alternative route candidate having the service center B 406 as a destination.

In one example, the autonomous driving control device 100 or 200 may set a priority of an alternative route candidate having the service center as a destination (the alternative route having the service center A 405 as a destination, the alternative route having the service center B 406 as a destination, the alternative route having the service center C 407 as a destination, and the alternative route having the service center D 408 as a destination) to be higher than a priority of an alternative route candidate having the emergency stop place as a destination (an alternative route having the emergency stop place E 409 as a destination and an alternative route having the emergency stop place F 410 as a destination).

In one example, because the service center C 407 is closer to the current position 402 than the service center D 408, the autonomous driving control device 100 or 200 may set a priority of an alternative route candidate having the service center C 407 as a destination to be higher than a priority of an alternative route candidate having the service center D 408 as a destination.

In one example, because the emergency stop place E 409 is closer to the existing destination 404 than the emergency stop place F 410 is, the autonomous driving control device 100 or 200 may set a priority of an alternative route candidate having the emergency stop place E 409 as a destination to be higher than a priority of an alternative route candidate having the emergency stop place F 410 as a destination.

In one example, the autonomous driving control device 100 or 200 may evaluate whether the alternative route candidates are suitable for autonomous driving sequentially according to priorities of the alternative route candidates.

In one example, the autonomous driving control device 100 or 200 may evaluate whether the alternative route candidate is suitable for the autonomous driving, based on whether each of points 411, 412, and 413 in which the prohibited function is required in response to the sensor fault is included in the alternative route candidate.

Specifically, the autonomous driving control device 100 or 200 may evaluate an alternative route not including the point where the prohibited function is required, that is, an alternative route having the service center D 408 as a destination, an alternative route having the emergency stop place E 409 as a destination, and an alternative route having the emergency stop place F 410 as a destination, as an alternative route candidate suitable for autonomous driving.

Further, the autonomous driving control device 100 or 200 may evaluate an alternative route having the service center A 405 as a destination including the point 413 where the prohibited function is required, an alternative route having the service center B 406 as a destination including the points 412 and 413 were the prohibited function is required, and an alternative route having the service center C 407 as a destination including the point 411 where the prohibited function is required as an alternative route candidate that is not suitable for autonomous driving.

In one example, when a specific alternative route candidate includes the points 411, 412, and/or 413 in which the prohibited function is required, and another vehicle that drives around the autonomous driving vehicle, and may provide the substitute sensor information is present in the specific alternative route candidate, the autonomous driving control device 100 or 200 may evaluate the specific alternative route candidate as an alternative route candidate suitable for autonomous driving.

Figure 5:
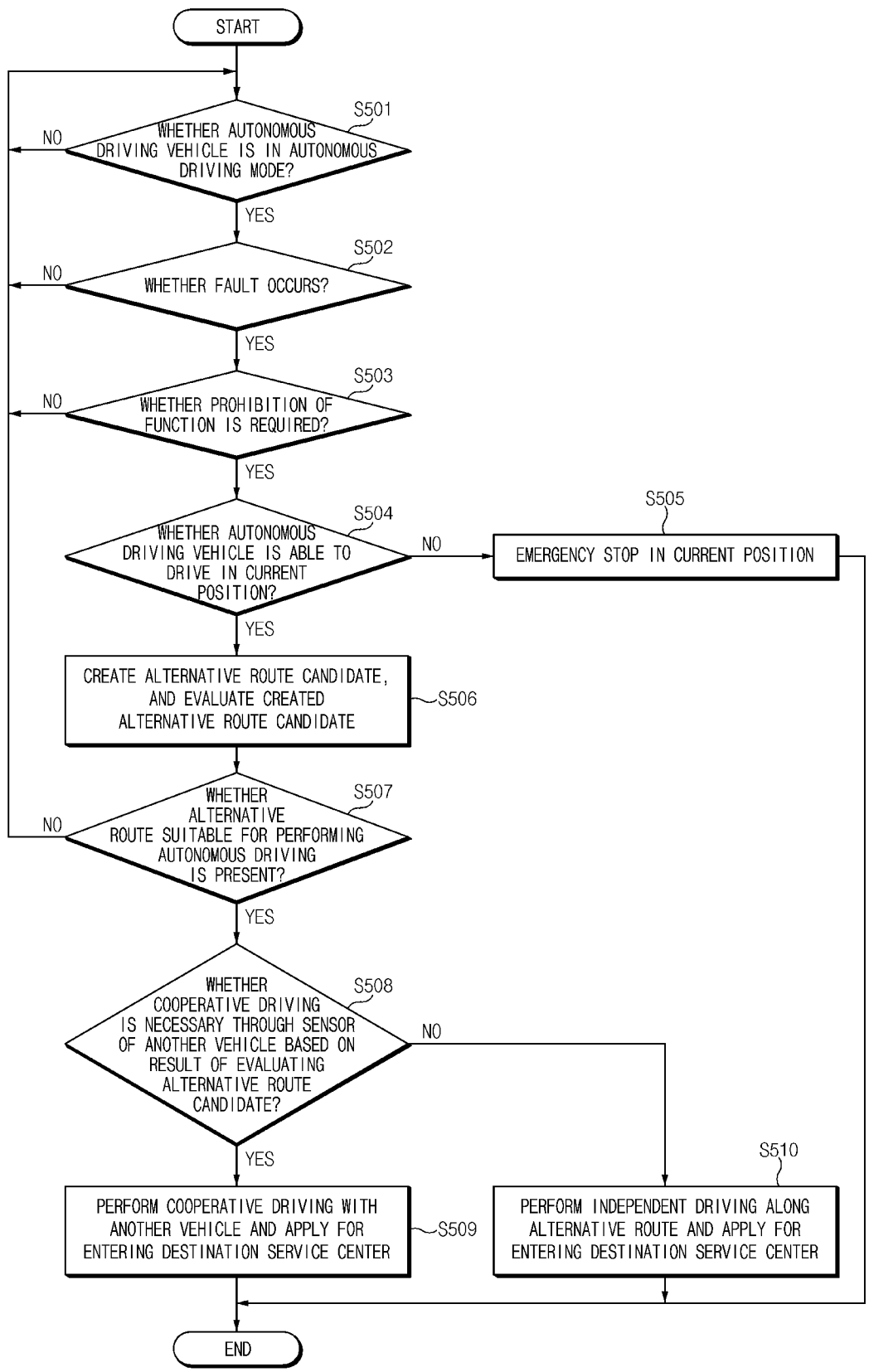
FIG. 5 is a flowchart showing an operation of an autonomous driving control device according to an embodiment of the present disclosure.

FIG. 5 is a flowchart showing an operation of an autonomous driving control device according to an embodiment of the present disclosure.

Referring to FIG. 5, the autonomous driving control device 100 or 200 may identify whether the autonomous driving vehicle is in an autonomous driving mode in S501.

In one example, the autonomous driving vehicle may drive in modes including the autonomous driving mode and a manual driving mode. The autonomous driving control device 100 or 200 may identify whether the autonomous driving vehicle is driving in the autonomous driving mode among the driving modes.

When the autonomous driving control device 100 or 200 identifies whether the autonomous driving vehicle is in the autonomous driving mode in S501, the autonomous driving control device 100 or 200 may identify that the autonomous driving vehicle is not in the autonomous driving mode. In this case, the autonomous driving control device 100 or 200 may return to S501 again, where the autonomous driving control device 100 or 200 may identify whether the autonomous driving vehicle is in the autonomous driving mode.

When the autonomous driving control device 100 or 200 identifies whether the autonomous driving vehicle is in the autonomous driving mode in S501, the autonomous driving control device 100 or 200 may identify that the autonomous driving vehicle is in the autonomous driving mode. In this case, the autonomous driving control device 100 or 200 may identify whether a fault is present in the sensor of the autonomous driving vehicle in S502.

In one example, the autonomous driving control device 100 or 200 may identify whether the fault is present in the sensor of the autonomous driving vehicle related to autonomous driving, using the fault diagnosis process pre-stored in the memory.

When the autonomous driving control device 100 or 200 identifies whether the fault is present in the sensor of the autonomous driving vehicle in S502, the autonomous driving control device 100 or 200 may identify that there is no fault in the sensor of the autonomous driving vehicle. In this case, the autonomous driving control device 100 or 200 may return to S501 where the autonomous driving control device 100 or 200 may identify whether the autonomous driving vehicle is in the autonomous driving mode.

When the autonomous driving control device 100 or 200 identifies whether the fault is present in the sensor of the autonomous driving vehicle in S502, the autonomous driving control device 100 or 200 may identify that the fault is present in the sensor of the autonomous driving vehicle. In this case, the autonomous driving control device 100 or 200 may identify whether prohibition of the autonomous driving related function is required due to the sensor fault in S503.

In one example, when the sensor information of the faulty sensor is not currently used for autonomous driving according to the driving route of the autonomous driving vehicle, the autonomous driving control device 100 or 200 may determine that the prohibition of the autonomous driving related function is not necessary.

When the autonomous driving control device 100 or 200 identifies whether or not the prohibition of the autonomous driving related function is necessary due to the sensor fault in S503, the autonomous driving control device 100 or 200 may identify that the prohibition of the autonomous driving related function is not necessary due to the sensor fault. In this case, the autonomous driving control device 100 or 200 may go back to S501 where the autonomous driving control device 100 or 200 may identify whether the autonomous driving vehicle is in the autonomous driving mode.

When the autonomous driving control device 100 or 200 identifies whether the prohibition of autonomous driving related function is necessary due to the sensor fault in S503, the autonomous driving control device 100 or 200 may identify that the prohibition of the autonomous driving related function is necessary due to the sensor fault. In this case, the autonomous driving control device 100 or 200 may identify whether the autonomous driving vehicle is able to drive in a current position in S504.

In one example, the autonomous driving control device 100 or 200 may identify whether or not the prohibition of the autonomous driving related function is necessary, based on a point in which a function using the sensor information of the faulty sensor is required in the existing driving route.

In one example, the existing driving route from the current position of the autonomous driving vehicle may include a point in which the function of using the sensor information of the sensor in which the fault occurs is required. Thus, the autonomous driving control device 100 or 200 may determine that in the current position of the autonomous driving vehicle, the function using the sensor information of the faulty sensor is necessary.

When the autonomous driving control device 100 or 200 identifies whether the autonomous driving vehicle is capable of driving in the current position in S504, the autonomous driving control device 100 or 200 may identify that the autonomous driving vehicle is not capable of driving in the current position. Thus, the autonomous driving control device 100 or 200 may perform emergency stop of the autonomous driving vehicle in the current position in S505.

When the autonomous driving control device 100 or 200 identifies whether the autonomous driving vehicle is capable of driving in the current position in S504, the autonomous driving control device 100 or 200 may identify that the autonomous driving vehicle is capable of driving in the current position. In this case, the autonomous driving control device 100 or 200 may create the alternative route candidate, and evaluate the created alternative route candidate in S506.

In one example, the autonomous driving control device 100 or 200 may create the alternative route candidate destined for the service center or the emergency stop place, and may evaluate whether the created alternative route candidate is suitable for autonomous driving or whether another vehicle to provide the substitute sensor information is required in a process in which the autonomous driving vehicle performs autonomous driving along the alternative route candidate.

The process in which the autonomous driving control device 100 or 200 create the alternative route candidate, and evaluates the created alternative route candidate will be described later in more detail through FIG. 6.

The autonomous driving control device 100 or 200 may create the alternative route candidate, and evaluate the created alternative route candidate in S506. Thus, based on a result of evaluating the alternative route candidate, the autonomous driving control device 100 or 200 may identify whether an alternative route suitable for performing autonomous driving is present in S507.

In one example, when an alternative route that does not include a point where a prohibited function is required is present among the alternative route candidates, the autonomous driving control device 100 or 200 may determine that an alternative route suitable for autonomous driving is present.

In one example, when an alternative route which includes a point where a prohibited function is required, and in which another vehicle that drives around the autonomous driving vehicle and may provide the substitute sensor information is present among the alternative route candidates, the autonomous driving control device 100 or 200 may determine that an alternative route suitable for performing autonomous driving is present.

When the autonomous driving control device 100 or 200 identifies whether an alternative route suitable for performing autonomous driving is present based on a result of evaluating the alternative route candidate in S507, it may be identified that there is no suitable alternative route to carry out the autonomous driving. In this case, the autonomous driving control device 100 or 200 may go back to S501 in which the autonomous driving control device 100 or 200 may identify whether the autonomous driving vehicle is in the autonomous driving mode.

When the autonomous driving control device 100 or 200 identifies whether an alternative route suitable for performing autonomous driving is present based on a result of evaluating the alternative route candidate in S507, it may be identified that there is a suitable alternative route to carry out the autonomous driving. In this case, the autonomous driving control device 100 or 200 may identify whether cooperative driving is necessary through a sensor of another vehicle based on a result of evaluating the alternative route candidate in S508.

In this connection, the cooperative driving means that there is another vehicle that may provide the substitute sensor information while driving around the autonomous driving vehicle, such that the autonomous driving vehicle receives the substitute sensor information obtained from the sensor of the another vehicle, and performs autonomous driving using the received substitute sensor information.

When the autonomous driving control device 100 or 200 identifies whether the cooperative driving is necessary through the sensor of another vehicle based on the result of evaluating the alternative route candidate in S508, it may be identified that cooperative driving through the another vehicle's sensor is required. Thus, the autonomous driving control device 100 or 200 may perform cooperative driving with the other vehicle and may apply for entering a destination service center in S509.

In one example, the autonomous driving control device 100 or 200 may transmit, to another vehicle, information about a speed amount by which a speed thereof should be adjusted for the cooperative driving with the autonomous driving vehicle, or may adjust a speed of the autonomous driving vehicle.

In one example, the autonomous driving control device 100 or 200 may transmit entrance application information through wireless communication, through the server or directly to the service center.

When the autonomous driving control device 100 or 200 identifies whether cooperative driving is necessary through the sensor of the other vehicle based on the result of evaluating the alternative route candidate in S508, it may be identified that cooperative driving through another vehicle's sensor is not required. In this case, the autonomous driving control device 100 or 200 may perform independent driving along the alternative route and may apply for entering a destination service center in S510.

Figure 6:
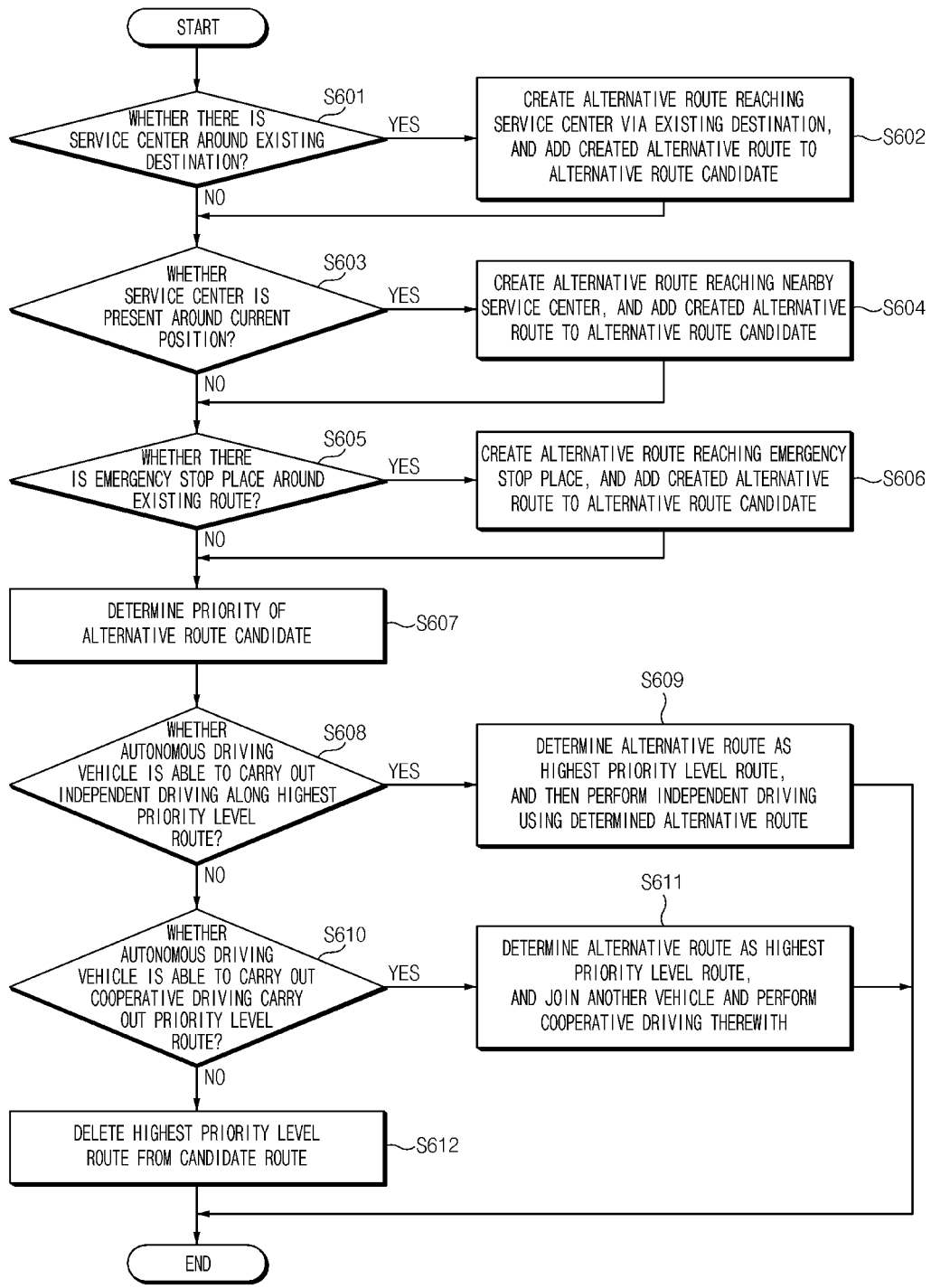
FIG. 6 is a flowchart showing a process in which an autonomous driving control device creates and evaluates an alternative route candidate according to an embodiment of the present disclosure.

FIG. 6 is a flowchart showing a process in which an autonomous driving control device creates and evaluates an alternative route candidate according to an embodiment of the present disclosure.

Referring to FIG. 6, the autonomous driving control device 100 or 200 may identify whether or not there is a service center around the existing destination in S601.

In one example, the autonomous driving control device 100 or 200 may identify whether a service center is present within a specific distance around the existing destination, based on navigation map information.

When the autonomous driving control device 100 or 200 identifies whether there is a service center around the existing destination in S601, it may be identified that the service center is present around the existing destination. In this case, the autonomous driving control device 100 or 200 may create an alternative route reaching the service center via the existing destination, and may add the created alternative route to the alternative route candidate in S602.

When the autonomous driving control device 100 or 200 identifies whether there is a service center around the existing destination in S601, it may be identified that the service center is not present around the existing destination. In this case, the autonomous driving control device 100 or 200 may identify whether the service center is present around a current position in S603.

The autonomous driving control device 100 or 200 may create the alternative route reaching the service center via the existing destination, and may add the created alternative route to the alternative route candidate in S602, and then may identify whether there is a service center around the current position in S603.

In one example, the autonomous driving control device 100 or 200 may identify whether a service center is present within a specific distance around the current position, based on navigation map information.

When the autonomous driving control device 100 or 200 identifies whether there is a service center around the current position in S603, it may be identified that there is the service center around the current position. In this case, the autonomous driving control device 100 or 200 may create an alternative route reaching a nearby service center, and may add the created alternative route to the alternative route candidate in S604.

When the autonomous driving control device 100 or 200 identifies whether there is a service center around the current position in S603, it may be identified that the service center is not present around the current position. In this case, the autonomous driving control device 100 or 200 may identify whether there is an emergency stop place around an existing route in S605.

The autonomous driving control device 100 or 200 may create the alternative route reaching the surrounding service center, and may add the created alternative route to the alternative route candidate in S604, and then may identify whether there is an emergency stop place around the existing route in S605.

In one example, the autonomous driving control device 100 or 200 may identify whether a preset emergency stop place is present within a specific distance of an existing driving route, based on navigation map information.

When the autonomous driving control device 100 or 200 identifies whether an emergency stop place is present around the existing route in S605, it may be identified that there is the emergency stop place around the existing route. In this case, the autonomous driving control device 100 or 200 may create an alternative route reaching the emergency stop place, and may add the created alternative route to the alternative route candidate in S606.

The autonomous driving control device 100 or 200 may create the alternative route reaching the emergency stop place, and then may add the created alternative route to the alternative route candidate in S606, and then may determine a priority of the alternative route candidate in S607.

When the autonomous driving control device 100 or 200 identifies whether an emergency stop place is present around the existing route in S605, it may be identified that there is no emergency stop place around the existing route. In this case, the autonomous driving control device 100 or 200 may determine the priority of the alternative route candidate in S607.

In one example, the autonomous driving control device 100 or 200 may set a priority of the alternative route candidate based on at least one of a type of a destination of the alternative route candidate, whether the alternative route candidate passes through an existing destination, a distance from a current position of the autonomous driving vehicle to the destination of the alternative route candidate, or a distance from the existing destination to the destination of the alternative route candidate.

After determining the priority of the alternative route candidate in S607, the autonomous driving control device 100 or 200 may identify whether the autonomous driving vehicle is able to carry out independent driving along the highest priority level route in S608.

In one example, the autonomous driving control device 100 or 200 may determine that the autonomous driving vehicle is able to carry out independent driving along the highest priority level route when a point in which a prohibited function is required according to the fault sensor is not included in the highest priority level route.

When the autonomous driving control device 100 or 200 identifies whether the autonomous driving vehicle is able to carry out independent driving along the highest priority level route in S608, it may be identified that the autonomous driving vehicle is able to carry out independent driving along the highest priority level route. In this case, the autonomous driving control device 100 or 200 may determine the alternative route as the highest priority level route, and then may perform independent driving using the determined alternative route in S609.

When the autonomous driving control device 100 or 200 identifies whether the autonomous driving vehicle is able to carry out independent driving along the highest priority level route in S608, it may be identified that the autonomous driving vehicle is not able to carry out independent driving along the highest priority level route. In this case, the autonomous driving control device 100 or 200 may identify whether the autonomous driving vehicle is able to carry out cooperative driving along the highest priority level route in S610.

The process in which the autonomous driving control device 100 or 200 identifies whether the autonomous driving vehicle is able to carry out cooperative driving along the highest priority level route will be described in more detail later through FIG. 7.

In one example, when a point in which a prohibited function is required according to the fault sensor is included in the highest priority level route, but another vehicle that may provide substitute sensor information while driving around the autonomous driving vehicle is present in the highest priority level route, the autonomous driving control device 100 or 200 may identify that the autonomous driving vehicle is able to carry out cooperative driving along the highest priority level route.

When the autonomous driving control device 100 or 200 identifies whether the autonomous driving vehicle is able to carry out cooperative driving along the highest priority level route in S610, it may be identified that the autonomous driving vehicle is able to carry out cooperative driving along the highest priority level route. In this case, the autonomous driving control device 100 or 200 may determine the alternative route as the highest priority level route, and may join another vehicle and perform the cooperative driving therewith in S611.

When the autonomous driving control device 100 or 200 identifies whether the autonomous driving vehicle is able to carry out cooperative driving along the highest priority level route in S610, it may be identified that the autonomous driving vehicle is not able to carry out cooperative driving along the highest priority level route. In this case, the autonomous driving control device 100 or 200 may delete the highest priority level route from the candidate route in S612.

Although not shown, the autonomous driving control device 100 or 200 may delete the highest priority level route from the candidate route in S612, and then, when there are remaining alternative route candidates, the autonomous driving control device 100 or 200 may return to S608 again to identify whether the autonomous driving vehicle is able to carry out independent driving along the highest priority level route.

Figure 7:
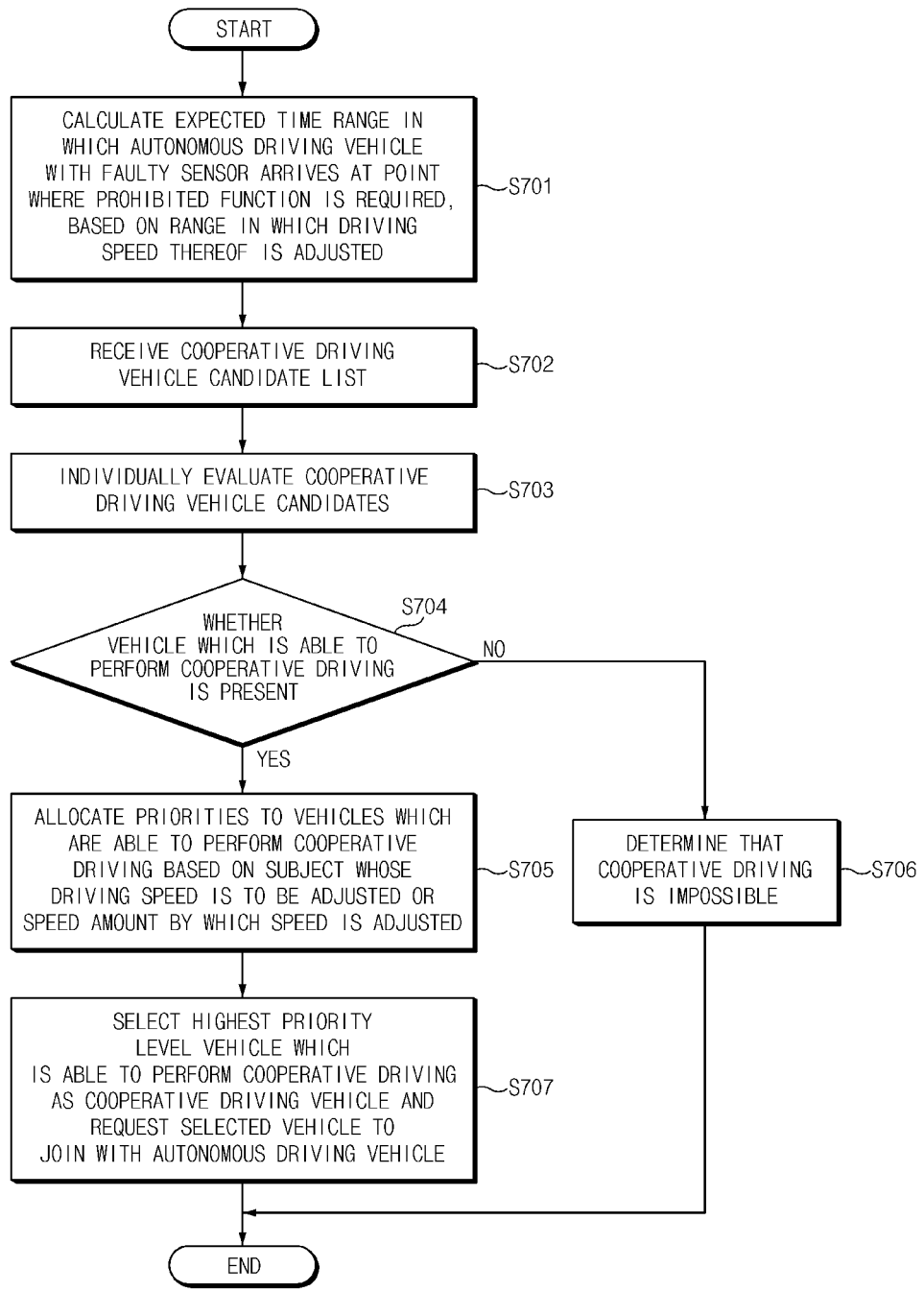
FIG. 7 is a flowchart showing a process in which an autonomous driving control device according to an embodiment of the present disclosure identifies whether another vehicle that may provide substitute sensor information is present along an alternative route candidate.

FIG. 7 is a flowchart showing a process in which an autonomous driving control device according to an embodiment of the present disclosure identifies whether another vehicle that may provide substitute sensor information is present in an alternative route candidate.

Referring to FIG. 7, the autonomous driving control device 100 or 200 may calculate the expected time range in which the autonomous driving vehicle arrives at the point in which the prohibited function is required due to the faulty senor, in consideration of driving speed control.

In one example, the autonomous driving control device 100 or 200 may calculate the expected time range in which the autonomous driving vehicle with a faulty sensor arrives at a point where the prohibited function is required, based on a range in which a driving speed thereof may be adjusted in S701.

The autonomous driving control device 100 or 200 may calculate the expected time range in which the autonomous driving vehicle arrives at the point in which the prohibited function is required due to the faulty sensor, in consideration of driving speed control in in S701 and then may receive a cooperative driving vehicle candidate list in S702.

In one example, the autonomous driving control device 100 or 200 may receive a list of cooperative driving vehicle candidates including other vehicles traveling on routes including points in which the prohibited function is required.

The autonomous driving control device 100 or 200 may receive the cooperative driving vehicle candidates list in S702 and then may individually evaluate the cooperative driving vehicle candidates in S703.

In one example, the autonomous driving control device 100 or 200 may evaluate the cooperative driving vehicle candidates individually, based on expected time ranges respectively in which the cooperative driving vehicle candidates arrive at the point where the prohibited function is required.

The process in which the autonomous driving control device 100 or 200 individually evaluates the cooperative driving vehicle candidates will be described in more detail later through FIG. 8.

The autonomous driving control device 100 or 200 may individually evaluate the cooperative driving vehicle candidates in S703, and then, may identify whether a vehicle which is able to perform cooperative driving is present in S704.

In one example, when a cooperative driving vehicle candidate which arrives at the point where the prohibited function is required in an expected time range which overlaps with the expected time range in which the autonomous driving vehicle arrives at the point where the prohibited function is required is present, the autonomous driving control device 100 or 200 may determine that the vehicle capable of the cooperative driving is present.

When the autonomous driving control device 100 or 200 identifies whether the vehicle which is able to perform cooperative driving is present in S704, it may be identified that the vehicle capable of cooperative driving is not present. In this case, the autonomous driving control device 100 or 200 may determine that the cooperative driving is impossible in S706.

When the autonomous driving control device 100 or 200 identifies whether the vehicle which is able to perform cooperative driving is present in S704, it may be identified that the vehicle capable of cooperative driving is present. In this case, the autonomous driving control device 100 or 200 may allocate priorities to vehicles which are able to perform cooperative driving based on a subject whose a driving speed is to be adjusted or a speed amount by which the speed is adjusted in S705.

In one example, the autonomous driving control device 100 or 200 may set a priority of a first vehicle which is able to perform cooperative driving with the autonomous driving vehicle to be higher than a priority of a second vehicle which is able to perform cooperative driving with the autonomous driving vehicle, wherein in order that the first vehicle and the autonomous driving vehicle join at the point where the prohibited function is required, only the speed of the autonomous driving vehicle should be adjusted, whereas in order that the second vehicle and the autonomous driving vehicle join at the point where the prohibited function is required, the speed of the second vehicle should be adjusted.

In one example, the autonomous driving control device 100 or 200 may allocate a higher priority to a vehicle capable of cooperative driving as a speed amount by which a speed of the vehicle capable of the cooperative driving should be adjusted is smaller.

The autonomous driving control device 100 or 200 may assign the priorities to the vehicles capable of cooperative driving based on a subject whose a driving speed is to be adjusted or the speed amount by which the speed is adjusted in S705, and then may select the highest priority level vehicle which is able to perform cooperative driving as the cooperative driving vehicle, and may request the selected vehicle to join with the autonomous driving vehicle in S707.

Figure 8:
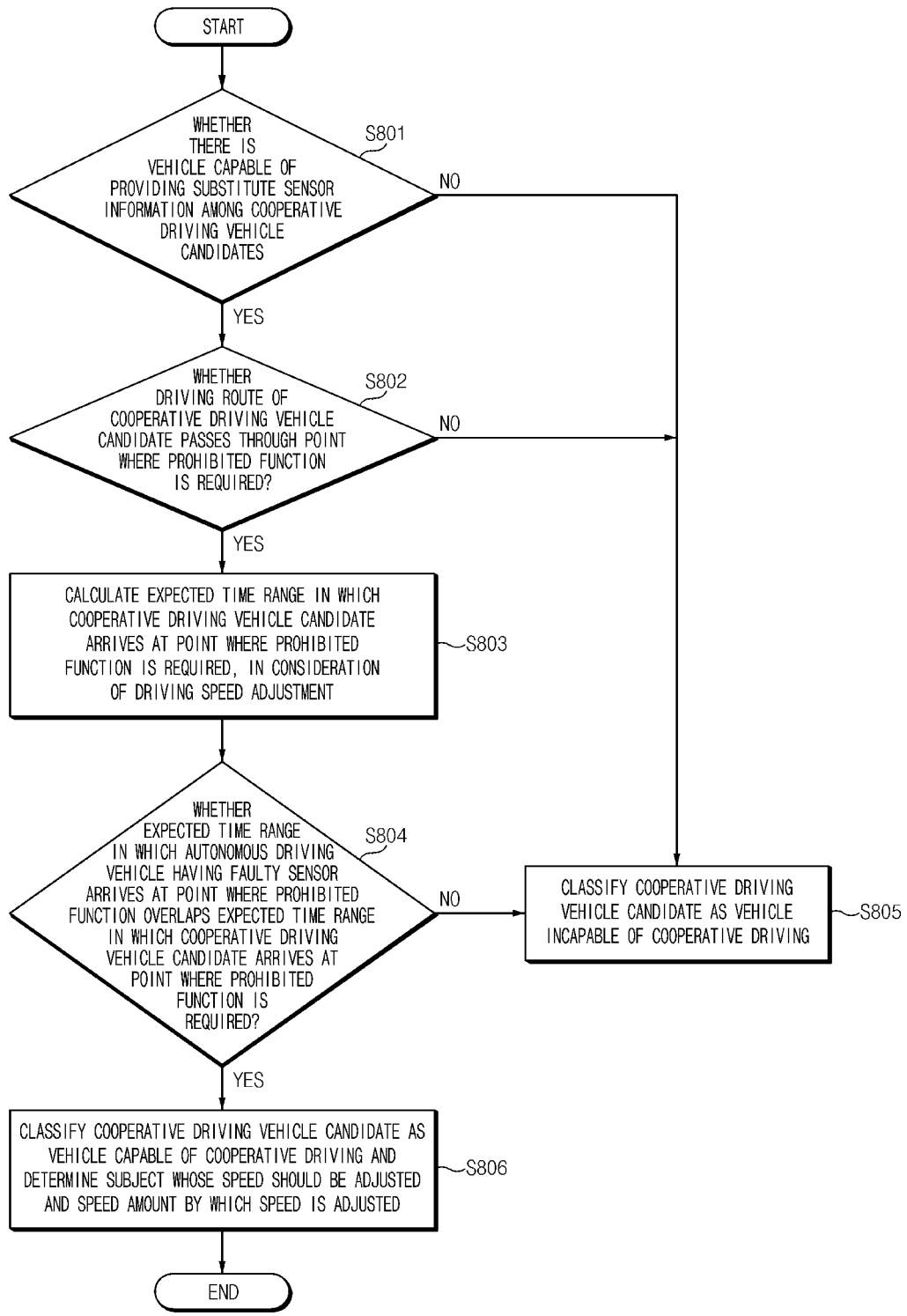
FIG. 8 is a flowchart showing a process in which an autonomous driving control device evaluates another vehicle candidate according to an embodiment of the present disclosure.

FIG. 8 is a flowchart showing a process in which an autonomous driving control device evaluates another vehicle candidate according to an embodiment of the present disclosure.

Referring to FIG. 8, the autonomous driving control device 100 or 200 may identify whether there is a vehicle capable of providing substitute sensor information among the cooperative driving vehicle candidates in S801.

In one example, the autonomous driving control device 100 or 200 may identify whether there is a vehicle equipped with a sensor that may provide senor information of the faulty sensor of the autonomous driving vehicle in place of the faulty sensor among the cooperative driving vehicle candidates.

When the autonomous driving control device 100 or 200 identifies whether a vehicle capable of providing the substitute sensor information is present among the cooperative driving vehicle candidates in S801, it may be identified that there is no vehicle capable of providing the substitute sensor information among the cooperative driving vehicle candidates. In this case, the autonomous driving control device 100 or 200 may classify the cooperative driving vehicle candidate as a vehicle incapable of cooperative driving in S805.

When the autonomous driving control device 100 or 200 identifies whether a vehicle capable of providing the substitute sensor information is present among the cooperative driving vehicle candidates in S801, it may be identified that the vehicle capable of providing the substitute sensor information is present among the cooperative driving vehicle candidates. In this case, the autonomous driving control device 100 or 200 may identify whether a driving route of the cooperative driving vehicle candidate passes through the point where the prohibited function is required in S802.

In one example, the autonomous driving control device 100 or 200 may communicate with the cooperative driving vehicle candidate or the server and thus may obtain information about the cooperative driving vehicle candidate's driving route, and then may identify whether the cooperative driving vehicle candidate's driving route includes the point in which the prohibited function is required.

When the autonomous driving control device 100 or 200 may identify whether the driving route of the cooperative driving vehicle candidate passes through the point where the prohibited function is required in S802, it may be identified that the cooperative driving vehicle candidate's driving route does not pass through the point where the prohibited function is required. In this case, the autonomous driving control device 100 or 200 may classify the cooperative driving vehicle candidate as a vehicle incapable of cooperative driving in S805.

When the autonomous driving control device 100 or 200 may identify whether the driving route of the cooperative driving vehicle candidate passes through the point where the prohibited function is required in S802, it may be identified that the cooperative driving vehicle candidate's driving route passes through the point where the prohibited function is required. In this case, the autonomous driving control device 100 or 200 may calculate an expected time range in which the cooperative driving vehicle candidate arrives at the point where the prohibited function is required, in consideration of driving speed adjustment in S803.

In one example, the autonomous driving control device 100 or 200 may calculate the expected range of time in which the cooperative driving vehicle candidate arrives at the point where the prohibited function is required, based on a range in which the cooperative driving vehicle candidate's driving speed may be adjusted.

The autonomous driving control device 100 or 200 may calculate an expected time range in which the cooperative driving vehicle candidate arrives at the point where the prohibited function is required, in consideration of driving speed adjustment in S803 and then may identify whether the expected time range in which the autonomous driving vehicle having the faulty sensor arrives at the point where the prohibited function is required overlaps the expected time range in which the cooperative driving vehicle candidate arrives at the point where the prohibited function is required in S804.

When the autonomous driving control device 100 or 200 identifies whether the expected time range in which the autonomous driving vehicle having the faulty sensor arrives at the point where the prohibited function is required overlaps the expected time range in which the cooperative driving vehicle candidate arrives at the point where the prohibited function is required in S804, it may be identified that the expected time range in which the autonomous driving vehicle having the faulty sensor arrives at the point where the prohibited function is required does not overlap the expected time range in which the cooperative driving vehicle candidate arrives at the point where the prohibited function is required. In this case, the autonomous driving control device 100 or 200 may classify the cooperative driving vehicle candidate as a vehicle incapable of cooperative driving in S805.

When the autonomous driving control device 100 or 200 identifies whether the expected time range in which the autonomous driving vehicle having the faulty sensor arrives at the point where the prohibited function is required overlaps the expected time range in which the cooperative driving vehicle candidate arrives at the point where the prohibited function is required in S804, it may be identified that the expected time range in which the autonomous driving vehicle having the faulty sensor arrives at the point where the prohibited function is required overlaps the expected time range in which the cooperative driving vehicle candidate arrives at the point where the prohibited function is required. In this case, the autonomous driving control device 100 or 200 may classify the cooperative driving vehicle candidate as a vehicle capable of cooperative driving and then may determine a subject whose a speed should be adjusted and the speed amount by which the speed is adjusted such that the vehicle capable of the cooperative driving and the autonomous driving vehicle join each other in S806.

Figure 9:
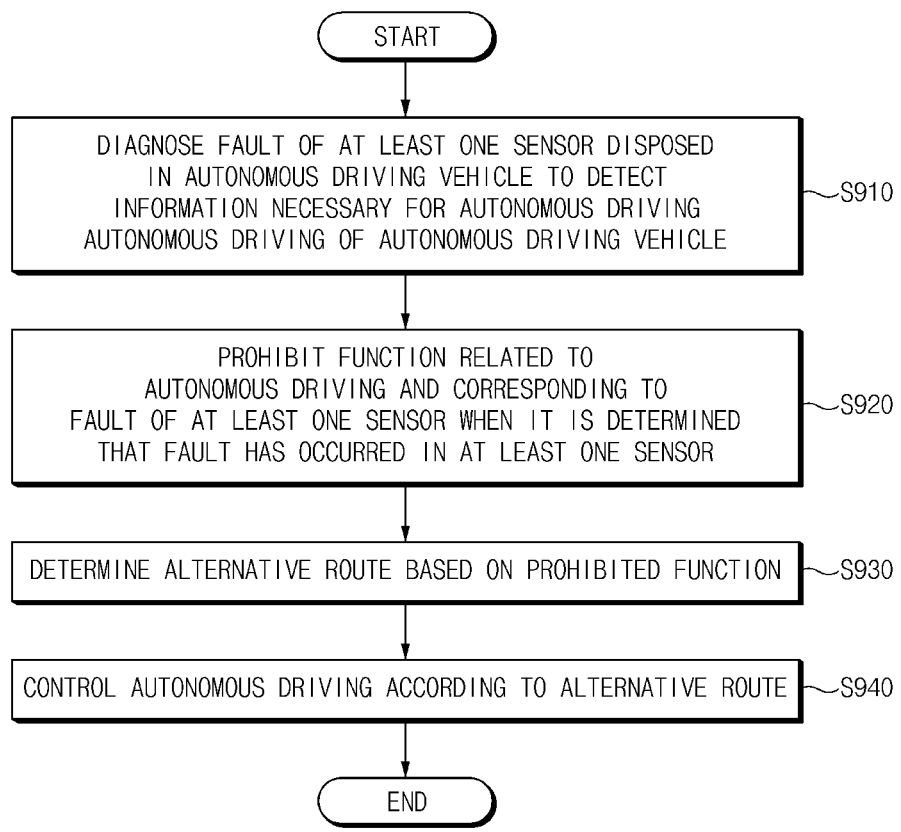
FIG. 9 is a flowchart showing an autonomous driving control method according to an embodiment of the present disclosure.

FIG. 9 is a flowchart showing an autonomous driving control method according to an embodiment of the present disclosure.

Referring to FIG. 9, the autonomous driving control method may include step S910 to diagnose a fault of at least one sensor disposed in the autonomous driving vehicle to detect information necessary for autonomous driving during autonomous driving of the autonomous driving vehicle, a step S920 of prohibiting a function related to the autonomous driving and corresponding to the fault of the at least one sensor when it is determined that the fault has occurred in the at least one sensor, step S930 of determining an alternative route based on the prohibited function, and step S940 of controlling autonomous driving according to the alternative route.

Step S910 of diagnosing the fault of the at least one sensor that is disposed in the autonomous driving vehicle and detects information necessary for autonomous driving during the autonomous driving of the autonomous driving vehicle may be performed using the controller 120 or 202.

Step S920 of prohibiting a function related to the autonomous driving and corresponding to the fault of the at least one sensor when it is determined that the fault has occurred in the at least one sensor may include prohibiting, by the controller 120 or 202, the function related to the autonomous driving that requires sensor information of the at least one faulty sensor 110 or 201.

Step S930 of determining the alternative route in consideration of the prohibited function may include, creating, by the controller 120 or 202, at least one alternative route candidate, and evaluating, by the controller 120 or 202, the alternative route candidate based on the prohibited function, and determining, by the controller 120 or 202, the route, based on the determination result.

In one example, evaluating, by the controller 120 or 202, the alternative route candidate based on the prohibited function, and determining, by the controller 120 or 202, the route, based on the determination result may include setting, by the controller 120 or 202, the priorities of the alternative route candidates based on at least one of the type of the destination of the alternative route candidate, whether the alternative route candidate passes through the existing destination, the distance from the current position of the autonomous driving vehicle to the destination of the alternative route candidate, or the distance from the existing destination to the destination of the alternative route candidate, and determining, by the controller 120 or 202, the alternative route based on a result of sequentially evaluating the alternative route candidates according to the set priorities.

In one example, evaluating, by the controller 120 or 202, the alternative route candidate based on the prohibited function, and determining, by the controller 120 or 202, the route, based on the determination result may include determining, by the controller 120 or 202, the alternative route based on a result of evaluating the alternative route candidates based on whether the point in which the prohibited function is required is included in each of the alternative route candidates.

In one example, evaluating, by the controller 120 or 202, the alternative route candidate based on the prohibited function, and determining, by the controller 120 or 202, the alternative route, based on the determination result may include, when the point where the prohibited function is required is included in the alternative route candidate, identifying, by the controller 120 or 202, whether another vehicle that drives around the autonomous driving vehicle and is able to provide substitute sensor information for the faulty sensor is present in the alternative route candidate, evaluating, by the controller 120 or 202, the alternative route candidate, based on whether another vehicle that drives around the autonomous driving vehicle and is able to provide the substitute sensor information is present in the alternative route candidate, and determining, by the controller 120 or 202, the alternative route, based on the evaluation result.

In one example, the identifying, by the controller 120 or 202, of whether another vehicle that drives around the autonomous driving vehicle and is able to provide substitute sensor information for the faulty sensor is present in the alternative route candidate may include, creating, by the controller 120 or 202, other vehicle candidates respectively having driving routes including the point where the prohibited function is required, an selecting, by the controller 120 or 202, another vehicle that drives around the autonomous driving vehicle and is able to provide the substitute sensor information from among the other vehicle candidates.

In one example, the selecting, by the controller 120 or 202, of another vehicle that drives around the autonomous driving vehicle and is able to provide the substitute sensor information from among the other vehicle candidates may include calculating, by the controller 120 or 202, expected time ranges respectively in which the autonomous driving vehicle and the another vehicle candidate arrive at the point where the prohibited function is required, and selecting, by the controller 120 or 202, the another vehicle, based on whether there is an overlap between the calculated expected time ranges respectively in which the autonomous driving vehicle and the another vehicle candidate arrive at the point where the prohibited function is required.

In one example, the selecting, by the controller 120 or 202, of another vehicle that drives around the autonomous driving vehicle and is able to provide the substitute sensor information from among the other vehicle candidates may include calculating, by the controller 120 or 202, a speed amount by which a speed of at least one of the autonomous driving vehicle or the another vehicle should be adjusted such that the another vehicle candidate drives around the autonomous driving vehicle, based on the expected time ranges respectively in which the autonomous driving vehicle and the another vehicle candidate arrive at the point where the prohibited function is required, and selecting, by the controller 120 or 202, the another vehicle in consideration of a subject whose a speed needs to be adjusted or a speed amount by which the speed is adjusted.

In one example, the autonomous driving control method may further include transmitting, by the controller 120 or 202, via the communication device 206, to the another vehicle, the speed amount by which a speed of the another vehicle should be adjusted such that the another vehicle candidate drives around the autonomous driving vehicle, wherein the communication device is disposed in the autonomous driving vehicle to communicate with the another vehicle or the server.

Step S940 of controlling the autonomous driving according to the alternative route may be performed based on the calculated amount by which the speed of the autonomous driving vehicle is to be adjusted.

In one example, step S940 of controlling the autonomous driving according to the alternative route may be performed using the substitute sensor information received from another vehicle.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The effects of the autonomous driving control device and method according to the present disclosure are described as follows.

According to at least one of the embodiments of the present disclosure, the device and the method for controlling autonomous driving when the sensor fault occurs during autonomous driving may be realized.

Further, according to at least one of the embodiments of the present disclosure, the device and the method for controlling autonomous driving thereof that may cope with the case where manual driving is impossible in an event of the sensor fault during autonomous driving may be realized.

Further, according to at least one of the embodiments of the present disclosure, the device and the method for controlling autonomous driving which may modify the autonomous driving route to move the autonomous driving vehicle to the service center in an event of the sensor fault during autonomous driving may be realized.

Further, according to at least one of the embodiments of the present disclosure, the device and the method for controlling autonomous driving which may search for and select another vehicle to provide the substitute sensor information to maintain autonomous driving in an event of the sensor fault during autonomous driving may be realized.

Further, according to at least one of the embodiments of the present disclosure, the device and the method for controlling autonomous driving in which when autonomous driving may not be maintained, the autonomous driving vehicle stops at the emergency stop place to promote safety may be realized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling autonomous driving, the device comprising:
    at least one sensor disposed in an autonomous driving vehicle configured to detect information for the autonomous driving of the autonomous driving vehicle; and
    a controller configured to:
        diagnose a fault of the at least one sensor using sensor information of the at least one sensor during autonomous driving of the autonomous driving vehicle;
        upon determination that the fault has occurred in the at least one sensor, prohibit an autonomous driving related function corresponding to the fault of the at least one sensor and identify at least one alternative route candidate to driving the autonomous vehicle;
        when a point where the prohibited function is required is included in the at least one alternative route candidate, identify whether another vehicle that drives nearby the autonomous driving vehicle and is able to provide substitute sensor information for the at least one sensor is present in the at least one alternative route candidate; and
        evaluate the at least one alternative route candidate and determine an alternative route to prohibit performing the function among the at least one alternative route candidate,
        based on whether the other vehicle that drives nearby the autonomous driving vehicle and is able to provide the substitute sensor information is present in the alternative route candidate:
        replace the sensor information of the at least one sensor with the substitute sensor information, by receiving the substitute sensor information from the other vehicle, and
        control the autonomous driving according to the determined alternative route based on the received substituted sensor information,
    wherein the point where the prohibited function is required includes a traffic light and the prohibited function includes prohibiting the autonomous driving vehicle from passing by the traffic light,
    wherein the at least one alternative route candidate includes a route candidate having an emergency stop place as a destination,
    wherein the controller is configured to:
        identify vehicle candidates respectively having driving routes including the point where the prohibited function is required, calculate expected time ranges respectively in which the autonomous driving vehicle and the vehicle candidates arrive at the point where the prohibited function is required, determine that the expected time ranges of the vehicle candidates, respectively, overlap with an expected time range in which the autonomous driving vehicle arrives at the point where the prohibit function is required, assign priorities to the vehicle candidates based on a driving speed that needs to be adjusted or a speed amount that needs to be adjusted, and select a vehicle with a highest priority level from the vehicle candidates, and wherein a vehicle candidate has a higher priority level when only a driving speed of the autonomous vehicle needs to be adjusted or when a speed amount that needs to be adjusted is lower for the vehicle candidate than for other vehicle candidates.

2. The device of claim 1, wherein the at least one alternative route candidate includes at least one of a route candidate having a service center as a destination or a route candidate having the emergency stop as the destination.

3. The device of claim 1, wherein the controller is further configured to:
set a priority of the alternative route candidate based on at least one of a type of a destination of the alternative route candidate, whether the alternative route candidate passes through an existing destination, a distance from a current position of the autonomous driving vehicle to the destination of the alternative route candidate or a distance from the existing destination to the destination of the alternative route candidate;
sequentially evaluate the at least one alternative route candidate according to a set priority thereof; and
determine the alternative route based on the evaluation result.

4. The device of claim 1, wherein the controller is further configured to:
evaluate the alternative route candidate based on whether the point where the prohibited function is required is included in the alternative route candidate; and
determine the alternative route based on the evaluation result.

5. The device of claim 1, further comprising
a communication device disposed in the autonomous driving vehicle,
wherein the communication device, under control of the controller, is configured to:
communicate with each of the vehicle or a server, and
request or receive the substitute sensor information thereto or therefrom.

6. The device of claim 1, wherein the controller is further configured to re-perform the function related to the autonomous driving using the substitute sensor information, thereby controlling the autonomous driving.

7. The device of claim 1, wherein the controller is further configured to transmit, via a communication device, to the other vehicle, a speed amount by which a speed of the other vehicle should be adjusted such that the other vehicle drives in a vicinity of the autonomous driving vehicle.

8. A method for controlling autonomous driving, the method comprising:
diagnosing, by a controller, a fault in at least one sensor using sensor information of the at least one sensor while autonomous driving of an autonomous driving vehicle, wherein the at least one sensor is disposed in the autonomous driving vehicle to detect information for the autonomous driving;
upon determination that the fault has occurred in the at least one sensor, prohibit the autonomous driving related function corresponding to the fault of the at least one sensor, and identify at least one alternative route candidate to driving the autonomous vehicle;
when a point where the prohibited function is required is included in the at least one alternative route candidate, identifying whether another vehicle that drives nearby the autonomous driving vehicle and is able to provide substitute sensor information for the at least one sensor is present in the at least one alternative route candidate;
evaluating the at least one alternative route candidate and determining an alternative route to prohibit performing the function among the at least one alternative route candidate;
based on whether the other vehicle that drives nearby the autonomous driving vehicle and is able to provide the substitute sensor information is present in the alternative route candidate:
replacing the sensor information of the at least one sensor with the substitute sensor information by receiving the substitute sensor information from the other vehicle, and
controlling the autonomous driving according to the determined alternative route based on the received substituted sensor information,
wherein the point where the prohibited function is required includes a traffic light and the prohibited function includes prohibiting the autonomous driving vehicle from passing by the traffic light, and
wherein the at least one alternative route candidate includes a route candidate having an emergency stop place as a destination;
identifying vehicle candidates respectively having driving routes including the point where the prohibited function is required;
calculating expected time ranges respectively in which the autonomous driving vehicle and the vehicle candidates arrive at the point where the prohibited function is required;
determining that the expected time ranges of the vehicle candidates, respectively, overlap with an expected time range in which the autonomous driving vehicle arrives at the point where the prohibit function is required;
assigning priorities to the vehicle candidates based on a driving speed that needs to be adjusted or a speed amount that needs to be adjusted; and
selecting a vehicle with a highest priority level from the vehicle candidates,
wherein a vehicle candidate has a higher priority level when only a driving speed of the autonomous vehicle needs to be adjusted or when a speed amount that needs to be adjusted is lower for the vehicle candidate than for other vehicle candidates.

9. The method of claim 8, wherein evaluating, by the controller, the at least one alternative route candidate, and determining, by the controller, the alternative route comprise:
setting, by the controller, a priority of the alternative route candidate based on at least one of a type of a destination of the alternative route candidate, whether the alternative route candidate passes through an existing destination, a distance from a current position of the autonomous driving vehicle to the destination of the alternative route candidate or a distance from the existing destination to the destination of the alternative route candidate;

sequentially evaluating, by the controller, the at least one alternative route candidate according to a set priority thereof; and determining, by the controller, the alternative route based on the evaluation result.

10. The method of claim 8, wherein evaluating, by the controller, the at least one alternative route candidate, and determining, by the controller, the alternative route comprise:

evaluating, by the controller, the alternative route candidate based on whether the point where the prohibited function is required is included in the alternative route candidate; and determining, by the controller, the alternative route based on the evaluation result.

11. The method of claim 8, further comprising transmitting, via a communication device, to the other vehicle, a speed amount by which a speed of the other vehicle needs to be adjusted such that the other vehicle drives in a vicinity of the autonomous driving vehicle, wherein the communication device is disposed in the autonomous driving vehicle.

* * * * *